INVENTOR
Allen T. Foster

Patented Jan. 18, 1949

2,459,371

UNITED STATES PATENT OFFICE 2,459,371

ADJUSTABLE SOLDERING IRON

Allen T. Foster, Chicago, Ill., assignor to Electric Soldering Iron Co., Inc., Deep River, Conn., a corporation of New York Application December 19, 1946, Serial No. 717,129

4 Claims. (Cl. 219—26)

This invention relates generally to electric soldering irons, and especially to what may be termed adjustable soldering irons.

While electric soldering irons having adjustable features are not unknown in the art, the present invention contemplates a very simple, relatively inexpensive but nevertheless effective soldering iron construction, wherein a positive adjustment of the iron casing in relation to the handle is readily facilitated.

One of the objects therefore of the present invention is to provide a soldering iron structure wherein the soldering iron casing is angularly adjustable in respect to the casing holder or handle.

Another object of this invention is to provide an electric soldering iron construction employing what may be termed a finger-grip type handle, at one end of which is adjustably mounted the soldering iron casing, and wherein means are provided for arresting the casing in its adjusted position relative to the handle.

Another object of this invention is to provide an electric soldering iron construction employing a handle and a soldering iron casing, wherein the latter may be adjusted both angularly and longitudinally relative to the handle, and wherein the handle is of the split or two-piece finger-grip type.

The foregoing and other important objects and advantages of the present invention will become more fully apparent from the ensuing description, in connection with the accompanying drawing, in which latter:

Figures 1, 2, 3, 4, 5:
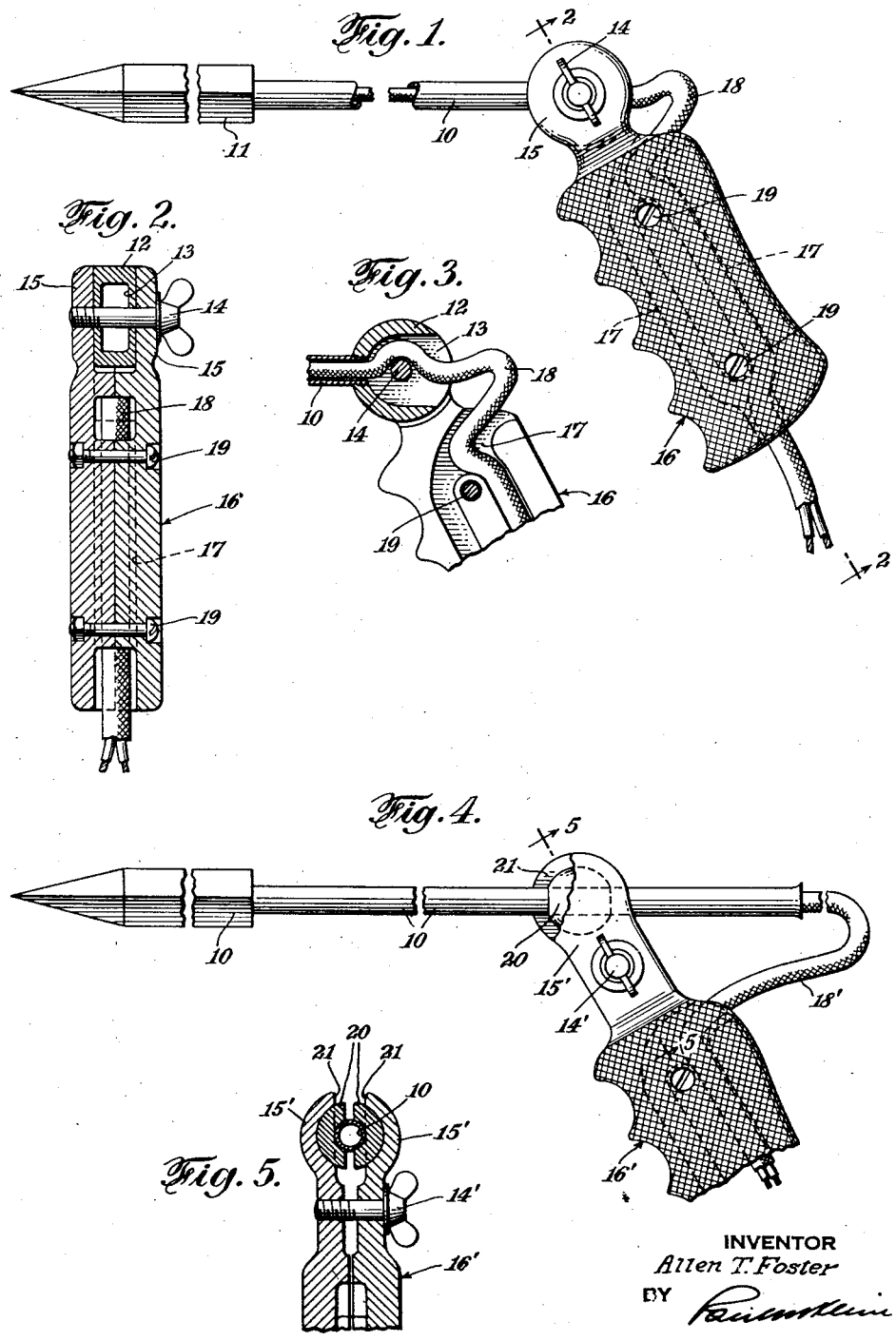
Fig. 1 illustrates one form of the device according to the present invention.
Fig. 2 is a section taken on line 2—2 of Fig. 1.
Fig. 3 is a partial detail view of the upper portion of the handle with the adjustable end of the iron casing in section.
Fig. 4 illustrates a modified form of the present invention.
Fig. 5 is a section taken on line 5—5 of Fig. 4.

Referring now specifically to the figures, numeral 10 denotes an electric iron casing provided with the usual tip 11, and which casing terminates at the end opposite to the tip into a cylindrical enlargement 12 with a recessed interior 13. In the side walls of enlargement 12 are provided apertures for the reception of a clamping bolt 14.

Enlargement 12 is operatively mounted between handle extensions 15, forming the upper ends of a two-piece, relatively flat finger-grip type handle 16, which may be considered a longitudinally and edgewisely split handle structure, and which latter has within its interior longitudinally disposed cavities 17 for the reception and accommodation of a conductor 18 leading via recess 13 in enlargement 12 to the iron casing. Extensions 15 are substantially annular in shape and are spaced sufficiently to accommodate and permit the adjustment therebetween of casing enlargement 12. Bolt 14 passes through an aperture provided in one of the handle extensions 15 and threadedly engages the other extension so that when the bolt is tightened, enlargement 12 of the iron casing is clamped against movement. The bodies of the two component handle parts are preferably bolted together as indicated at 19.

In the above-described construction, casing 10 and its tip 11 may be adjusted angularly in respect to split handle 16. In Figs. 4 and 5 a modification is illustrated, wherein handle extensions 15′ terminate in substantially hollow, semi-spherical formations for the reception of a substantially spherical body 20. The latter may be made either in one piece, slotted along its vertical center plane, or may be composed of two equal spaced halves. In either form it is adapted to be angularly adjustable within extensions 15′ and is provided with two cooperating semi-cylindrical recesses for the reception of casing 10. Extensions 15′ are somewhat longer than extensions 15 in Fig. 1, and below their spherical termini there is arranged a clamping bolt 14′. When this bolt is loosened, the casing may be adjusted longitudinally within spherical body 20, and also may be swung with that body to any angular position relative to the handle. It will be noted that the two opposite faces 21 of the semi-spherical termini of extensions 15′ are spaced sufficiently to permit a free angular adjustment of casing 10, and at the same time serve as guide for the latter.

The simplicity and effectiveness of the device in either of its two embodiments is readily apparent. Due to that simplicity the manufacturing cost of the device is relatively low. The handle parts may be made from any suitable material, such as plastic, light metal, etc.

Although only one specific construction of the soldering iron casing is shown for reason of simplicity, any other type of soldering iron structure may be adapted to be held between two split handle parts. By the same token the handle construction may have to be altered to accommodate different types of soldering iron structures, for which reason it is evident that changes, improvements and modifications may have to be resorted to in order to meet different conditions, such changes lying within the broad scope of the present invention, as defined in the annexed claims. What is claimed as new is:

1. An adjustable electric soldering iron, comprising in combination a relatively flat, finger-grip type handle composed of two edgewisely united parts provided with longitudinal cavities for accommodating a conductor, one end of the handle parts being adjustable in respect to each other and forming means for the reception of and for adjustably holding an iron casing, and means at that one end of the handle parts for fixing the casing in its desired, adjusted position, said casing holding means comprising a pair of spaced handle extensions having substantially annular termini, and means for drawing the latter toward each other for clamping between them a portion of the iron casing.

2. An adjustable electric soldering iron, comprising in combination a relatively flat, finger-grip type handle composed of two edgewisely united parts provided with longitudinal cavities for accommodating a conductor, one end of the handle parts being adjustable in respect to each other and forming means for the reception of and for adjustably holding an iron casing, and means at that one end of the handle parts for fixing the casing in its desired, adjusted position, said casing holding means comprising a pair of spaced handle extensions having substantially annular termini, said iron casing having an annular, perforated end enlargement adapted to be placed between and held against movement relative to said handle termini, and a clamping bolt passing through said termini and the perforation of said casing enlargement.

3. An adjustable electric soldering iron, comprising in combination a relatively flat, finger-grip type handle composed of two edgewisely united parts provided with longitudinal cavities for accommodating a conductor, one end of the handle parts being adjustable in respect to each other and forming means for the reception of and for adjustably holding an iron casing, and means at that one end of the handle parts for fixing the casing in its desired, adjusted position, said casing holding means comprising a pair of spaced handle extensions having hollow, substantially semi-spherical termini, a split spherically shaped member adjustably mounted within the hollow portions of the handle extensions and being adapted to hold the casing for axial adjustment, means for drawing the handle extension toward each other for clamping said spherical member against angular movement, thereby also holding the casing in its axially and angularly adjusted position.

4. In an adjustable soldering iron construction, a split handle composed of two like cooperating halves having spaced and reduced extensions terminating in semi-spherical formations, a split spherical body operatively held and angularly adjustable within these formations and having means for engaging the iron casing and for facilitating its axial adjustment, and means for drawing said extensions toward each other, thereby compressing said spherical body and thus holding the casing in its angularly and axially adjusted position.

ALLEN T. FOSTER.

REFERENCES CITED

The following references are of record in the file of this patent:

FOREIGN PATENTS

| Number | Country | Date |
|---|---|---|
| 556,609 | Great Britain | Oct. 13, 1943 |